United States Patent
Chen et al.

(10) Patent No.: US 10,193,758 B2
(45) Date of Patent: Jan. 29, 2019

(54) COMMUNICATION VIA A CONNECTION MANAGEMENT MESSAGE THAT USES AN ATTRIBUTE HAVING INFORMATION ON QUEUE PAIR OBJECTS OF A PROXY NODE IN A SWITCHLESS NETWORK

(71) Applicant: International Business Machines Corporation, Armonk, NY (US)

(72) Inventors: Lior Chen, Jerusalem (IL); Gregory Etelson, Rehovot (IL); Constantine Gavrilov, Rishon-le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/131,834

(22) Filed: Apr. 18, 2016

(65) Prior Publication Data

US 2017/0302526 A1    Oct. 19, 2017

(51) Int. Cl.
   *G06F 15/16*    (2006.01)
   *H04L 12/24*    (2006.01)
   *H04L 29/08*    (2006.01)

(52) U.S. Cl.
   CPC .......... *H04L 41/12* (2013.01); *H04L 67/1097* (2013.01)

(58) Field of Classification Search
   CPC ..................... H04L 41/12; H04L 67/1097
   See application file for complete search history.

(56) References Cited

U.S. PATENT DOCUMENTS

| | | | |
|---|---|---|---|
| 6,154,449 A | 11/2000 | Rhodes et al. | |
| 6,516,000 B1 * | 2/2003 | Kshirsagar | H04L 12/4608 370/399 |
| 7,468,982 B2 | 12/2008 | Mehra et al. | |
| 7,580,359 B2 * | 8/2009 | Pirbhai | H04L 45/10 370/237 |
| 8,228,913 B2 | 7/2012 | Block et al. | |
| 8,451,860 B2 | 5/2013 | Kinstler | |
| 9,124,383 B1 | 9/2015 | Frankel et al. | |
| 9,344,346 B2 * | 5/2016 | Geib | H04L 41/08 |
| 9,748,691 B2 | 8/2017 | Soubh et al. | |
| 2002/0018467 A1 * | 2/2002 | Rajan | H04L 29/06 370/389 |
| 2003/0120852 A1 | 6/2003 | McConnell et al. | |

(Continued)

OTHER PUBLICATIONS

Anonymous, "Method to Balance Interprocess High Performance Communication", dated 2014, an IP.com Prior Art Database Technical Disclosure, Total 4 pages.

(Continued)

*Primary Examiner* — Moustafa M Meky
(74) *Attorney, Agent, or Firm* — Rabindranath Dutta; Konrad, Raynes, Davda and Victor LLP

(57) ABSTRACT

A connection management message that uses a proxy attribute is received, wherein the connection management message includes information on a first proxy queue pair and a second proxy queue pair, wherein the first proxy queue pair provides communication between a proxy node and an initiator node in a switchless network, and wherein the second proxy queue pair provides communication between the proxy node and a target node in the switchless network. The connection management message that uses the proxy attribute, channels datagrams received from the initiator node to the target node in the switchless network.

20 Claims, 10 Drawing Sheets

(56) References Cited

U.S. PATENT DOCUMENTS

| | | |
|---|---|---|
| 2004/0004963 A1 | 1/2004 | Mehra et al. |
| 2004/0049663 A1 | 3/2004 | Hansen et al. |
| 2004/0156322 A1 | 8/2004 | Mehra |
| 2005/0204026 A1 | 9/2005 | Hoerl |
| 2008/0109526 A1 | 5/2008 | Subramanian et al. |
| 2008/0123552 A1 | 5/2008 | Slaton |
| 2008/0126509 A1 | 5/2008 | Subramanian et al. |
| 2008/0279110 A1* | 11/2008 | Hart .................. H04L 43/0811 370/248 |
| 2010/0082853 A1 | 4/2010 | Block et al. |
| 2012/0195431 A1 | 8/2012 | Garcia Morchon et al. |
| 2013/0054947 A1 | 2/2013 | Gavrilov |
| 2013/0315098 A1 | 11/2013 | Bombacino et al. |
| 2013/0343204 A1* | 12/2013 | Geib ...................... H04L 41/08 370/248 |
| 2015/0295756 A1 | 10/2015 | Yin et al. |
| 2015/0338909 A1 | 11/2015 | Woodruff |
| 2015/0350057 A1 | 12/2015 | Huang et al. |

OTHER PUBLICATIONS

"InfiniBandTM Architecture Specification", dated Mar. 3, 2015, vol. 1 Release 1.3, InfiniBandSM Trade Association, Total 1842 pages.

Li et al., "Power Shifting in Thrifty Interconnection Network", dated 2011, Total 12 pages.

Lists of Related Applications, pp. 2, dated Apr. 18, 2016.

U.S. Appl. No. 15/131,817, dated Apr. 18, 2016, filed Apr. 18, 2016, invented by Lior Chen et al., Total 30 pages.

U.S. Appl. No. 15/131,822, dated Apr. 18, 2016, filed Apr. 18, 2016, invented by Lior Chen et al., Total 38 pages.

U.S. Appl. No. 15/131,828, dated Apr. 18, 2016, filed Apr. 18, 2016, invented by Lior Chen et al., Total 38 pages.

Response to Office Action, dated Jan. 23, 2018, for U.S. Appl. No. 15/131,817, filed Apr. 18, 2016, invented by Lior Chen et al., Total 11 pages.

Response to Office Action, dated Feb. 20, 2018, for U.S. Appl. No. 15/131,822, filed Apr. 18, 2016, invented by Lior Chen et al., Total 10 pages.

Response to Office Action, dated Feb. 20, 2018, for U.S. Appl. No. 15/131,828, filed Apr. 18, 2016, invented by Lior Chen et al., Total 10 pages.

Supplemental Amendment with Appended Terminal Disclaimer, dated Mar. 23, 2018, for U.S. Appl. No. 15/131,822, filed Apr. 18, 2016, invented by Lior Chen et al., Total 10 pages.

Office Action, dated Oct. 23, 2017, for U.S. Appl. No. 15/131,817, filed Apr. 18, 2016, invented by Lior Chen et al., Total 17 pages.

Office Action, dated Nov. 17, 2017, for U.S. Appl. No. 15/131,822, filed Apr. 18, 2016, invented by Lior Chen et al., Total 20 pages.

Office Action, dated Oct. 20, 2017, for U.S. Appl. No. 15/131,828, filed Apr. 18, 2016, invented by Lior Chen et al., Total 15 pages.

Notice of Allowance, dated Apr. 25, 2018, for U.S. Appl. No. 15/131,817 filed Apr. 18, 2016, invented by Lior Chen et al., Total 18 pages.

Notice of Allowance, dated Apr. 11, 2018, for U.S. Appl. No. 15/131,822 filed Apr. 18, 2016, invented by Lior Chen, Total 20 pages.

Notice of Allowance, dated Apr. 25, 2018, for U.S. Appl. No. 15/131,828 filed Apr. 18, 2016, invented by Lior Chen, Total 17 pages.

Notice of Allowance, dated Oct. 19, 2018, for U.S. Appl. No. 15/131,817 filed Apr. 18, 2016, invented by Lior Chen et al., Total 11 pages.

Notice of Allowance, dated Oct. 18, 2018, for U.S. Appl. No. 15/131,822 filed Apr. 18, 2016, invented by Lior Chen, Total 16 pages.

Notice of Allowance, dated Oct. 24, 2018, for U.S. Appl. No. 15/131,828 filed Apr. 18, 2016, invented by Lior Chen, Total 10 pages.

\* cited by examiner

COMMUNICATION VIA A CONNECTION MANAGEMENT MESSAGE THAT USES AN ATTRIBUTE HAVING INFORMATION ON QUEUE PAIR OBJECTS OF A PROXY NODE IN A SWITCHLESS NETWORK

BACKGROUND

1. Field

Embodiments relate to a method, system, and computer program product for communication via a connection management message that uses an attribute having information on queue pair objects of a proxy node in a switchless network.

2. Background

In a computer network a plurality of devices may communicate with a plurality of other devices. In many situations the devices are interconnected via a plurality of switches, where a switch is a computer networking device that connects the plurality of devices together in a computer network, by using packet switching to receive, process and forward data from a source device to the destination device via zero or more intermediate devices. Therefore, the switches may logically configure communication links between the plurality of devices with physical links being located between the switch and each device. Such a network that uses switches may be referred to as a switched computer network.

In contrast, in switchless computer networks, the plurality of devices are connected via dedicated links that do not includes switches. A device may receive a packet from one device and forward the packet to another device. As a result, a source device may be able to communicate with a destination device in switchless computer networks via one or more intermediate devices.

A subnet is a logical, visible subdivision of an Internet Protocol (IP) network. The practice of dividing a network into two or more networks is called subnetting. Computers, devices, and/or nodes that belong to a subnet are addressed via a common, identical, most-significant bit-group in their IP address. In a packet switched network (e.g., an IP network), a datagram is a basic data transfer unit. A datagram may be a self-contained, independent entity of data carrying sufficient information to be routed from the source to the destination computer without reliance on earlier exchanges between the source and the destination computer and the transporting network. The delivery, arrival time, and order of arrival does not have to be guaranteed by the packet switched network.

InfiniBand* is a computer-networking communications standard that may be used in a computer network for communication among a plurality of devices. Further details of InfiniBand may be found in the publication "InfiniBand Architecture, Specification Volume 1, Release 1.3", published Mar. 3, 2015 by the InfiniBand Trade Association, and the publication is hereinafter referred to as the "InfiniBand standard". The InfiniBand standard provides further descriptions for formats associated with datagrams, subnets, and other entities of a packet switched network. The InfiniBand standard defines a format for management messages which supports common processing, where the management messages are referred to as management datagrams (MAD). Each management datagram contains the same header format that identifies the class of a management message and the method. In the InfiniBand standard, the management datagrams used for administration of a subnet are described. Subnet administration uses particular formats for management datagrams, and such management datagrams are referred to as subnet administration management datagrams.

*InfiniBand is a registered trademark of the InfiniBand Trade Association.

SUMMARY OF THE PREFERRED EMBODIMENTS

Provided are a method, a system, and a computer program product in which a connection management message that uses a proxy attribute is received, wherein the connection management message includes information on a first proxy queue pair and a second proxy queue pair, wherein the first proxy queue pair provides communication between a proxy node and an initiator node in a switchless network, and wherein the second proxy queue pair provides communication between the proxy node and a target node in the switchless network. The connection management message that uses the proxy attribute, channels datagrams received from the initiator node to the target node in the switchless network.

In additional embodiments, host channel adapters of the initiator node, the proxy node, and the target node do not have routing capabilities for routing datagrams.

In further embodiments, the connection management message comprises a special management datagram (MAD) class in the InfiniBand standard, and the proxy attribute comprises a ProxyMADcommand in the InfiniBand standard.

In additional embodiments, the first proxy queue pair and the second proxy queue pair are generated in response to determining that a hop count for a received datagram does not equal a hop length for the datagram.

In certain embodiments, a normal queue pair is generated in response to determining that a hop count for a received datagram equals a hop length for the datagram.

In further embodiments, Remote Direct memory Access (RDMA) writes are performed by the first and the second proxy queue pairs by determining free reserved addresses from a next proxy node and then performing RDMA writes to the next proxy node.

In certain embodiments, the datagrams are associated with connection management in an InfiniBand network.

BRIEF DESCRIPTION OF THE DRAWINGS

Referring now to the drawings in which like reference numbers represent corresponding parts throughout.

DETAILED DESCRIPTION

Figure 1:
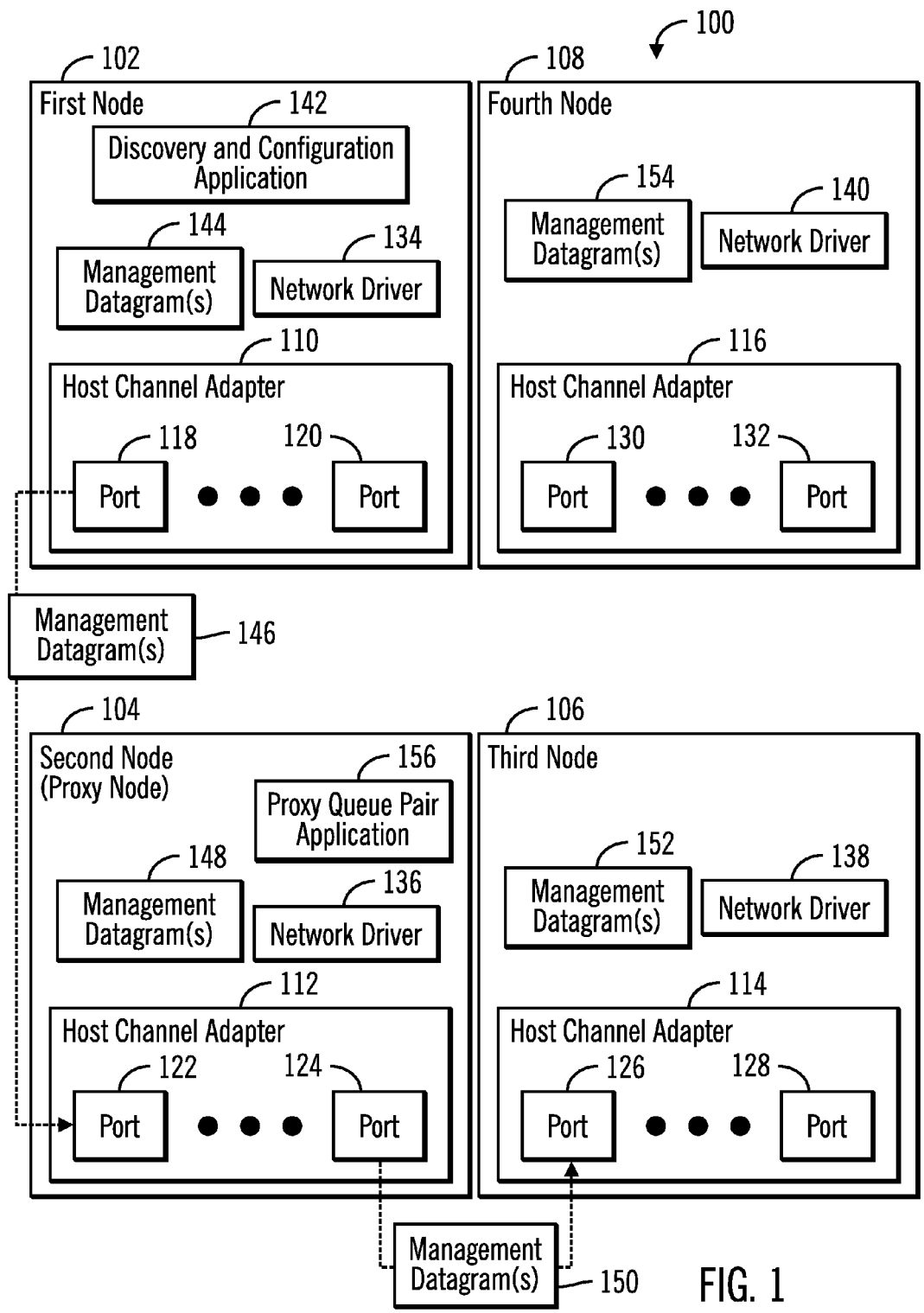
FIG. 1 illustrates a block diagram of a computing environment comprising a plurality of nodes coupled in a switchless network, in accordance with certain embodiments.

In the following description, reference is made to the accompanying drawings which form a part hereof and which illustrate several embodiments. It is understood that other embodiments may be utilized and structural and operational changes may be made.

The discovery and configuration of InfiniBand networks may be performed by using subnet manager protocol (SMP) direct routed management datagrams (MAD) that specify source to destination routes, and further details may be found in Chapter 15 ("Subnet Administration") of the publication "InfiniBand Architecture, Specification Volume 1, Release 1.3", published Mar. 3, 2015 by the InfiniBand Trade Association. In current InfiniBand networks, the transmission of such management datagrams may be terminated at host channel adapters (HCA) in a switchless network, and as a result the management datagrams cannot be propagated from node to node. In switched networks the switches manage and forward the management datagrams which allows the transmission of such management datagrams between any pair of ports in the network.

InfiniBand connections are established between queue pair (QP) objects on source and destination as per the InfiniBand standard. In order to establish connection, the QP objects are created on both end-points of the connection and information about addresses of the end-points and QP numbers are exchanged. After the information is exchanged, QP objects on both ends are modified to reflect the remote information (i.e., information at the destination) and moved to a connected state. The actual modification is a multi-step process that involves moving QP to an initialized (INIT), ready-to-receive (RTR), and ready-to-send (RTS) state. Each state transition involves setting certain local and remote parameters as indicated in by the InfiniBand standard. Using connected QPs assumes that routable messages may be sent between a source and a destination. Certain embodiments describe a method, system, and a computer program product to implement InfiniBand connections using multihop point-to-point links in a switchless network.

Customized or standard software solutions may be used to exchange information and perform state transitions in switched InfiniBand networks. Customized software solutions may provide Internet Protocol (IP) communications (via IP over InfiniBand or redundant Ethernet links) and manual QP transitions upon receiving the required information. Standard software solutions may utilize connection management (CM) InfiniBand datagrams to exchange information. An application that wants to establish a connection creates a QP and sends a CM connection request. The remote entity receives the request and, in response to the request, creates a QP, and moves it from INIT state to RTR state, using initiator parameters as required by the InfiniBand standard. When QP is moved to RTR state, a reply is sent, providing the target QP information. The initiator, upon receiving the RTR message, moves the QP to RTR state using the target information and then to an RTS state. When QP is moved to the RTS state, a ready-to-use (RTU) message is sent by the initiator to the target. The target moves its QP to RTS state upon receipt of the RTU message.

However, CM datagrams may not travel across multiple hops in switchless networks. Furthermore, send messages are not routed across host channel adapters (HCA). In order to provide the required functionality for connection establishment in switchless networks, in certain embodiments "proxy queue pairs" are implemented. The proxy queue pairs provide routable connections in switchless networks such that connection management datagrams and data packets may travel across multiple hops. The proxy queue pairs are used to perform application data transfers after a connection is established and this is their sole purpose, and they are normal queue pairs as far as host channel adapters are concerned [unless application specific integrated circuit (ASIC) support or firmware support is provided and the ASIC is aware about forwarding datagrams].

In certain embodiments, the connection manager requests are a special management datagram (MAD) class in the InfiniBand standard. Connection requests are channeled by using a proxy connection manager attribute of the connection manager request.

Exemplary Embodiments

FIG. 1 illustrates a block diagram of a computing environment 100 comprising a plurality of nodes 102, 104, 106, 108 that are coupled in a switchless network, in accordance with certain embodiments. While in FIG. 1 only four nodes 102, 104, 106, 108 are shown, in alternative embodiments there may be a fewer or a greater number of nodes.

Each node may comprise any suitable computational device including those presently known in the art, such as, a personal computer, a workstation, a server, a mainframe, a hand held computer, a palm top computer, a telephony device, a network appliance, a blade computer, a processing device, a controller, etc. The nodes may be elements in any suitable network that is switchless. The switchless network is a network that does not rely on switches to direct or transmit packets. In certain embodiments, the nodes 102, 104, 106, 108 may be elements in a cloud computing environment.

The plurality of nodes 102, 104, 106, 108 may each include a host channel adapter (HCA) that may in certain embodiments comprise a peripheral component interconnect (PCI) card. The host channel adapter is hardware that allows packets to be received and transmitted in the switchless network. In FIG. 1, four representative host channel adapters 110, 112, 114, 116 are shown. The host channel adapters 110, 112, 114, 116 may include a plurality of ports, such as ports 118, 120, 122, 124, 126, 128, 130, 132. In FIG. 1, port 118 is shown in communication with port 122, and port 124 is shown in communication with port 126. In certain embodiments, the communication between any two ports is controlled via software implemented network drivers 134, 136, 138, 140, and other software implemented applications such as the discovery and configuration application 142 in the computing environment 100. The network drivers 134, 136, 138, 140 may interface with the host channel adapters 110, 112, 114, 116.

Managements datagrams 144, 146, 148, 150, 152, 154 may be used to transmit network or connection management requests from node to note in the switchless network of the computing environment 100. The control, configuration, and management of the management datagrams 144, 146, 148, 150, 152, 154 may be performed by at least the network drivers 134, 136, 138, 140 and the discovery and configuration application 142. While only one discovery and configuration application 142 has been shown in the first node 102, other nodes may also have similar applications.

In FIG. 1, the discovery and configuration application 142 in coordination with the network driver 134 configures the management datagram 144 for sending via port 118 of the host channel adapter 110. The management datagram 146 (corresponding to management datagram 144) is shown being transmitted from port 118 of the host channel adapter 110 of the first node 102, to port 122 of the host channel adapter 112 of the second node 104. Similarly management datagram 150 may be sent from port 124 of the second node 104 to port 126 of the third node 108.

In FIG. 1, the second node 104 may act as a proxy node that routes management datagrams from the first node 102 to the third node 106. The proxy node 104 may include a proxy queue pair application 156 that in cooperation with the network driver 136 generates proxy queue pair objects for routing management datagrams in the switchless fabric comprising the plurality of nodes 102, 104, 106, 108.

Figure 2:
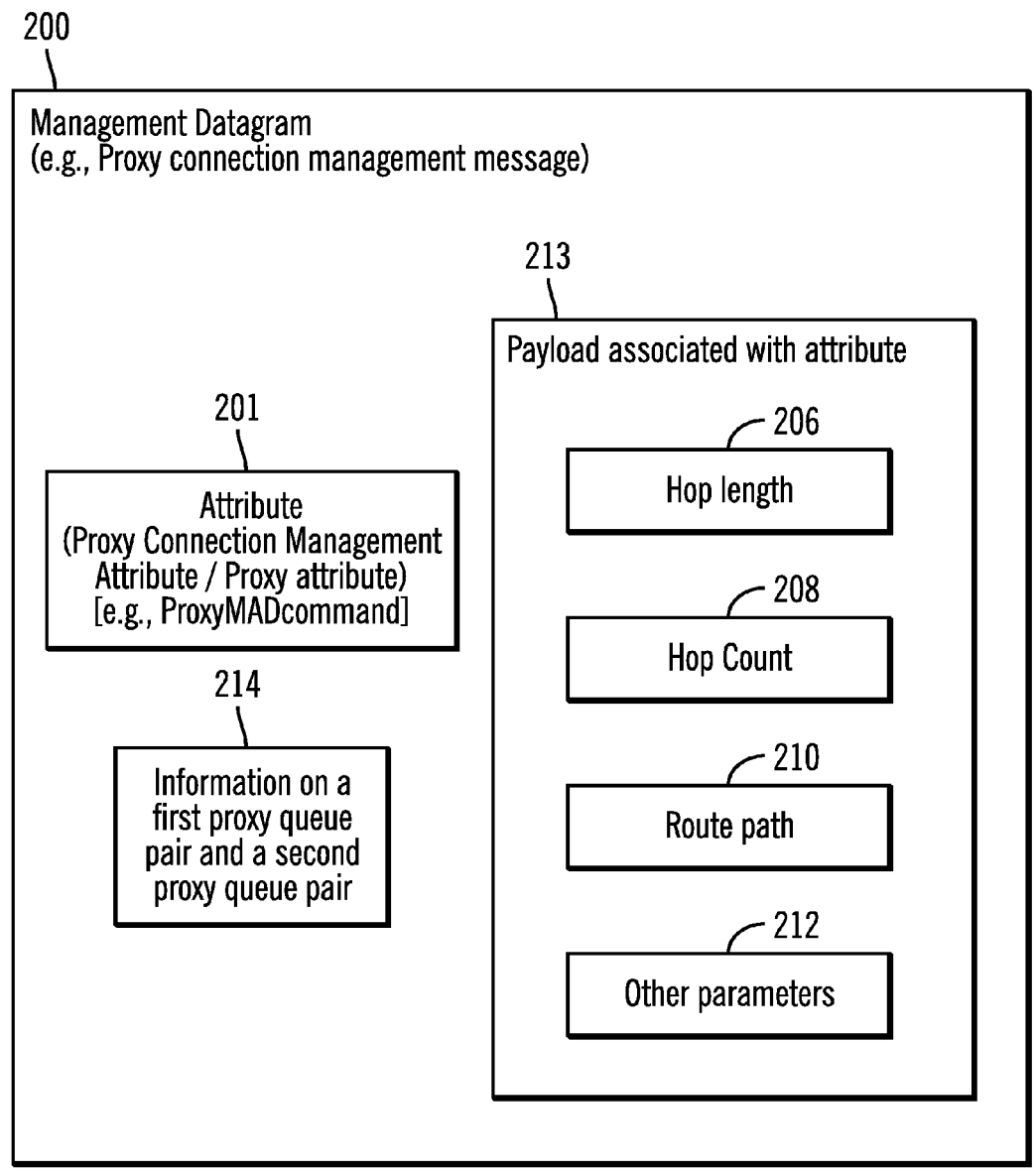
FIG. 2 illustrates a block diagram of a management datagram that may comprise a proxy connection management message with a proxy connection management attribute, in accordance with certain embodiments.

FIG. 2 illustrates a block diagram 200 of a management datagram that may comprise a proxy connection management message with a proxy connection management attribute 201, in accordance with certain embodiments. In certain embodiments, each management datagram 200 includes indicators and/or data structures corresponding to a hop length 206, a hop count 208, a route path 210, and other parameters 212 in a payload 213 associated with the proxy connection management attribute 201. The proxy connection management attribute 201 is also referred to as a proxy attribute and may comprise a ProxyMADcommand in the InfiniBand standard. The proxy connection management attribute 201 may convey information 214 on a first proxy queue pair and a second proxy queue pair that may be stored in the proxy node 104.

The hop length 206 indicates the number of hops the management datagram is to be forwarded in the switchless network. The hop count 208 indicates the number of hops executed, i.e., number of hops already forwarded. The route path 210 indicates the source to destination route for management datagrams among nodes.

Figure 3:
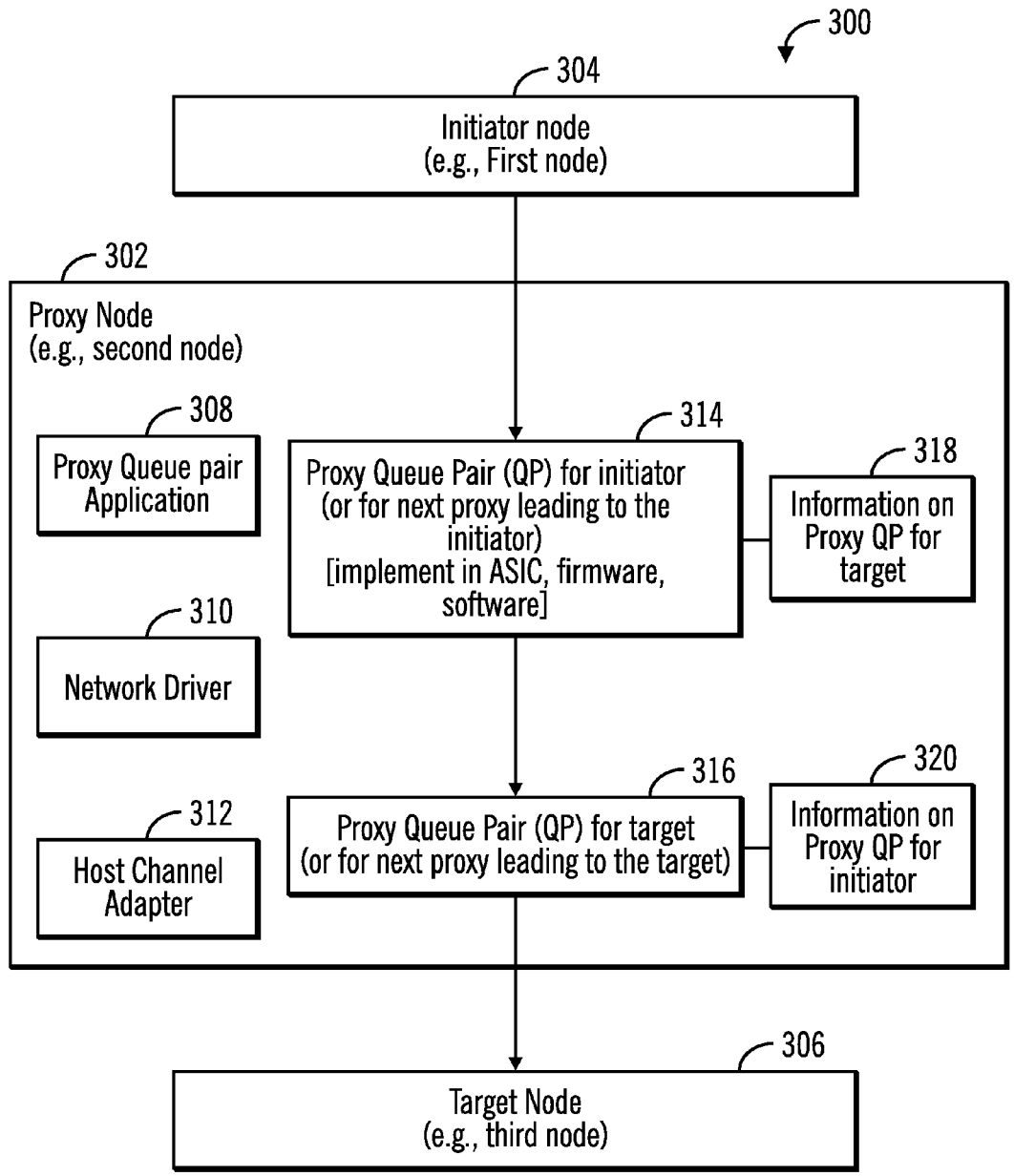
FIG. 3 illustrates a block diagram of proxy queue pairs in a proxy node coupled to an initiator node and a target node, in accordance with certain embodiments.

FIG. 3 illustrates a block diagram 300 of proxy queue pairs in a proxy node 302 coupled to an initiator node 304 and a target node 306, in accordance with certain embodiments. In certain embodiments, the proxy node 302 may correspond to the second node 104 of FIG. 1, the initiator node 304 may correspond to the first node 102 of FIG. 1, and the target node may correspond to the third node 106 of FIG. 1. Information regarding the proxy queue pairs may be maintained in the proxy attribute 201 of the proxy connection management message 200.

The proxy node may include a proxy queue pair application 308 that coordinates with a network driver 310 of a host channel adapter 312 of the proxy node 302. The proxy queue pair application 308 generates two proxy queue pair objects 314, 316 based on information maintained in the proxy attribute 201 of the proxy connection management message 200. The first proxy queue pair 314 is for the initiator and the second proxy queue pair 316 is for the target. In certain alternative embodiments, the first proxy queue pair 314 is for the next proxy leading to the initiator, and the second proxy queue pair 316 is for the next proxy leading to the target.

The proxy queue pair 314 for the initiator has access to information on the proxy queue pair for the target (shown via reference numeral 318), and the proxy queue pair 316 for the target has access to information on the proxy queue pair for the initiator (shown via reference numeral 320).

Figure 4:
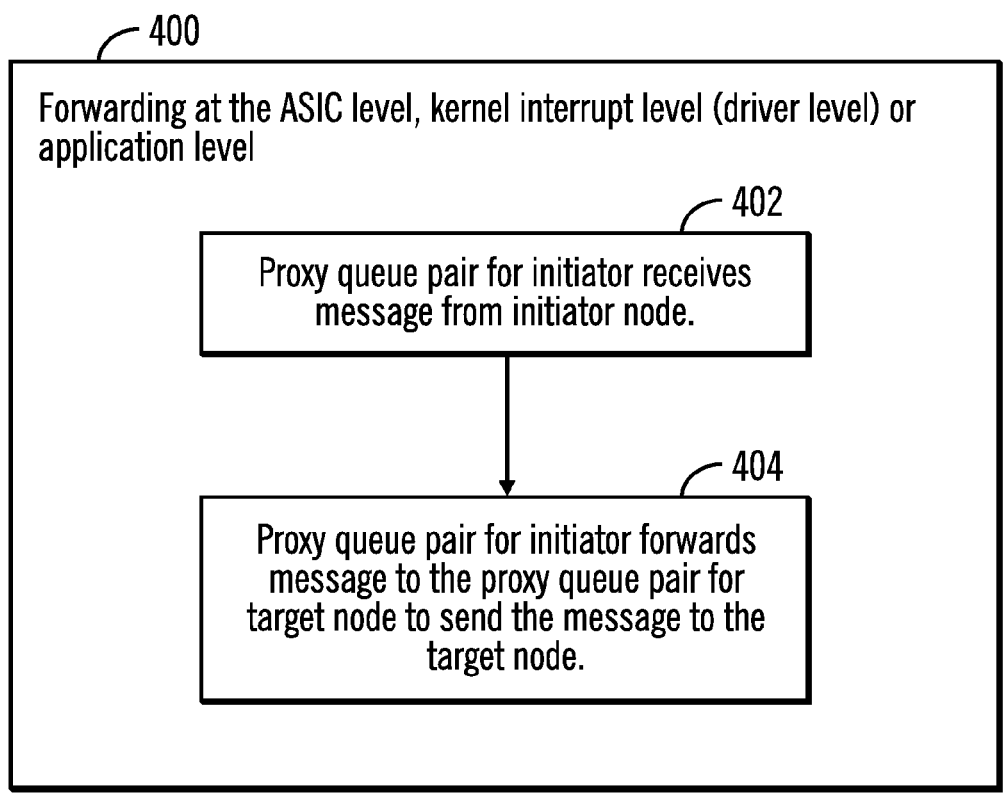
FIG. 4 illustrates a flowchart that shows messages being forwarded between proxy queue pairs, in accordance with certain embodiments.

FIG. 4 illustrates a flowchart 400 that shows messages, i.e., datagrams, being forwarded between proxy queue pairs after a connection is established, in accordance with certain embodiments. The forwarding may be performed at the Application Specific Integrated Circuit (ASIC) level, the kernel interrupt (i.e., the driver) level, or at the application level.

Control starts at block 402 in which the proxy queue pair 314 for the initiator receives a message from the initiator node 304. In response to receiving the message, the proxy queue pair 314 for the initiator forwards the message to the proxy queue pair 316 for the target node to send the message to the target node 306.

Figure 5:
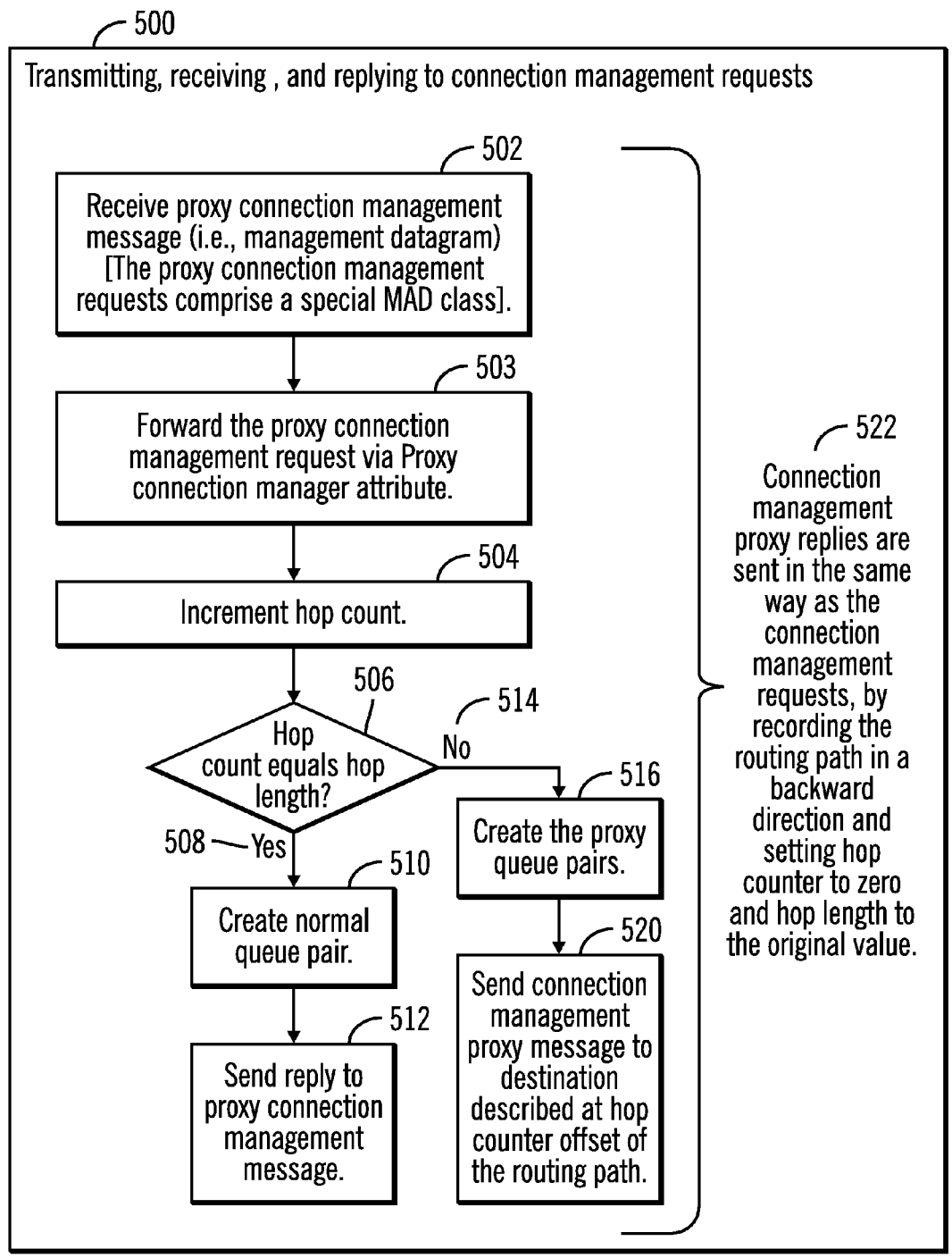
FIG. 5 illustrates a flowchart that shows generation of proxy queue pairs and normal queue pairs, in accordance with certain embodiments.

FIG. 5 illustrates a flowchart 500 that shows generation of proxy queue pairs and normal queue pairs, in accordance with certain embodiments. The normal queue pairs may correspond to queue pairs implemented in switched networks of InfiniBand networks and do not include proxy queue pairs.

A proxy connection management message (i.e., a datagrams) records hop length, hop counter, and a route path. Upon receiving a proxy CM message (at block 502), the proxy CM message is forwarded (at block 503) by using the proxy attribute, and the hop counter is incremented (at block 504).

A determination is made as to whether the hop count equals the hop length at block 506). If the hop count is equal to the hop length ("Yes" branch 508) control proceeds to block 510 in which a normal queue pair is generated, as no further routing to another node has to be performed. A reply is sent (at block 512) to the proxy connection management message.

If the hop count is not equal to hop length, ("No" branch 514) then the pair of proxy queue pairs is created (at block 516), and a connection management proxy message is sent to the destination described at hop counter offset of the routing path (at block 520). The connection management proxy replies are sent in the same way as the connection management requests by recording the routing path in a backward direction and setting hop counter to zero and hop length to the original value (as shown via reference numeral 522).

Figure 6:
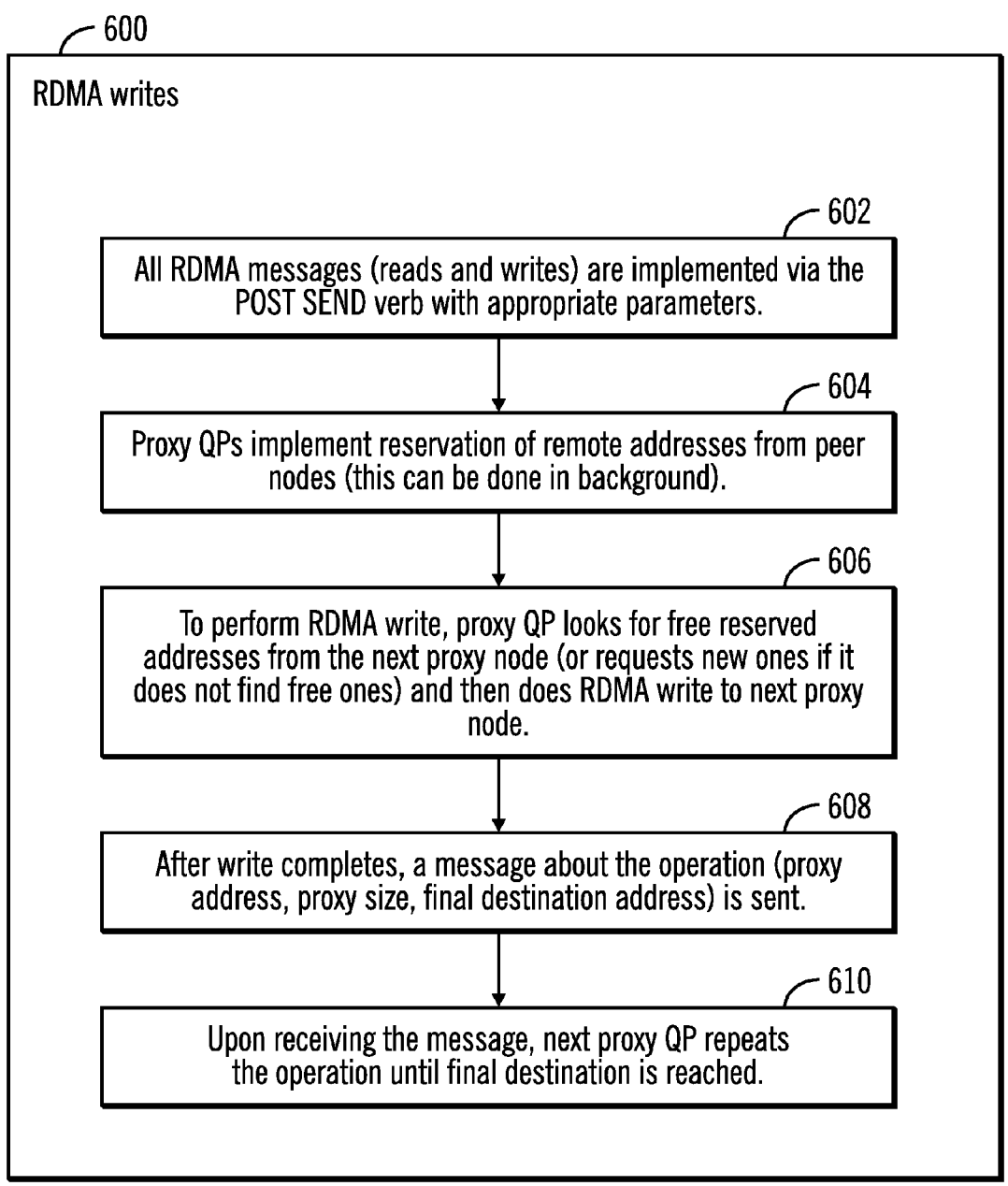
FIG. 6 illustrates a flowchart that shows remote direct memory access via proxy queue pairs, in accordance with certain embodiments.

FIG. 6 illustrates a flowchart that shows remote direct memory access (RDMA) via proxy queue pairs, in accordance with certain embodiments.

For sending of RDMA messages, if ASIC support is provided, then the sending is handled automatically as per the InfiniBand standard (the ASIC forwards the message via another port). If ASIC support exists, then physical layer RDMA messages are transferred automatically. Otherwise, a software layer indirection is needed to redirect messages as shown in FIG. 7 via the use of the proxy queue pairs.

All RDMA messages (reads and writes) are implemented as the POST SEND verb with appropriate parameters as per the InfiniBand standard (shown via reference numeral 602). The method is provided by the verbs library and it may be different for proxy and initiators that are not directly connected. The method may send normal POST SEND requests describing RMDA operation. For optimized performance, it is preferred that proxy queue pairs implement reservation of remote addresses from peer nodes (this may be done in background as shown via reference numeral 604). Then, native RDMA writes with a synchronization message may be used to perform the operation. To perform a RDMA write, proxy queue pairs look for free reserved addresses from the next proxy node (or requests new ones if it does not find free ones) and then performs a RDMA write to next proxy node (as shown via reference numeral 606). After the write completes, a message about the operation (proxy address, proxy size, final destination address) may be sent (block 608). Upon receiving the message, the next proxy queue pair repeats (at block 610) the operation until the final destination is reached.

Additionally, while not discussed in FIG. 6 that describes RDMA writes, RDMA reads are sent via proxy queue pairs as proxy requests. When reading from the final destination, the result is returned as a RDMA write in the backward direction. Care must be taken to return completions of writes and reads only after they actually complete. Again, this can be performed via a software layer.

Figure 7:
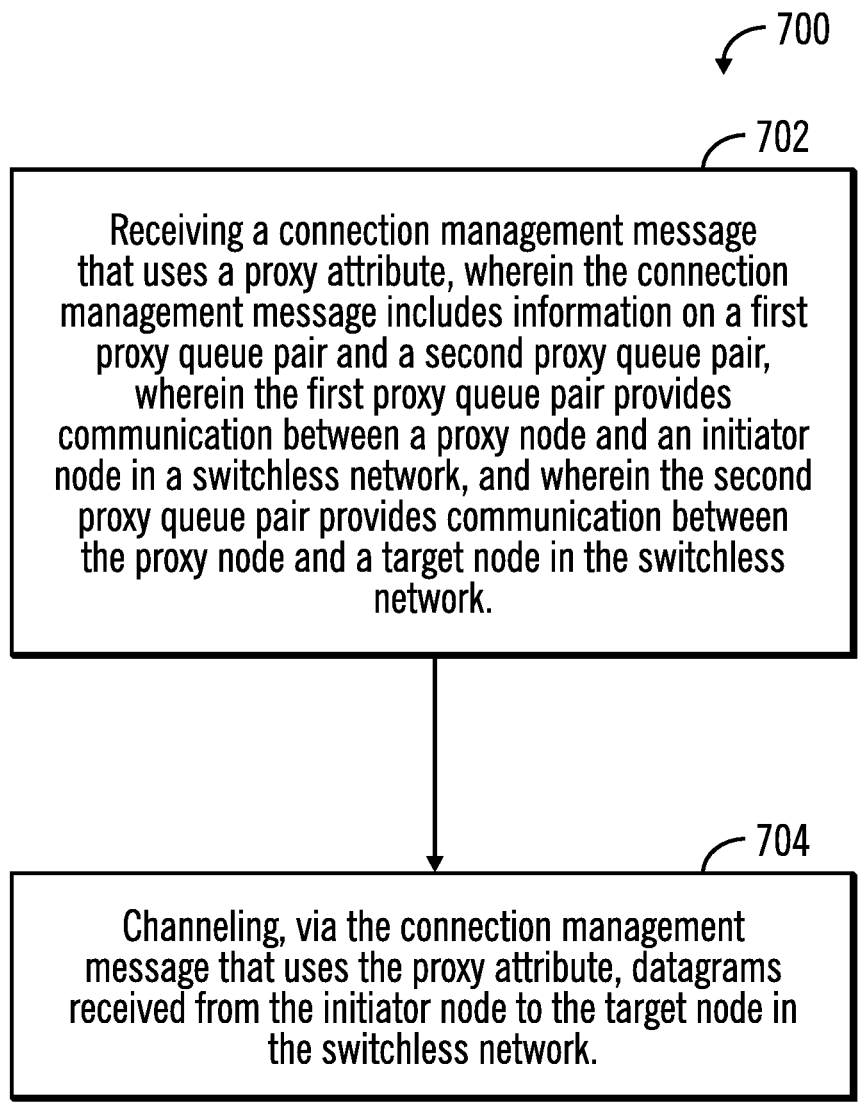
FIG. 7 illustrates a flowchart that shows channeling via a connection management message that uses a proxy attribute, in accordance with certain embodiments.

FIG. 7 illustrates a flowchart 700 that shows the channeling (i.e., transmission and/or forwarding of packets) of packets via the connection management message 200 by using the proxy attribute 201, in accordance with certain embodiments. The operations shown in FIG. 7 may be performed in the proxy node 104, 302.

Control starts at block 702 in which a connection management message 200 that uses a proxy attribute 201 is received, wherein the connection management message 200 includes information on a first proxy queue pair 314 and a second proxy queue pair 316, wherein the first proxy queue pair 314 provides communication between a proxy node 302 and an initiator node 304 in a switchless network, and wherein the second proxy queue pair 316 provides communication between the proxy node 302 and a target node 306 in the switchless network. The connection management message 200 that uses the proxy attribute, channels datagrams received from the initiator node 304 to the target node 306 in the switchless network.

Therefore, FIGS. 1-7 illustrates certain embodiments for application data transfer in a switchless network across a plurality of hops by generating data structures referred to as proxy queue pairs in proxy nodes after connection is established. The proxy queue pairs provide routable connections in switchless networks such that connection requests and application data may travel across multiple hops. Connection management requests are a special MAD class in an InfiniBand standard. Connection requests are forwarded by a proxy connection manager attribute. In certain embodiments, the connection management message 200 that uses the proxy attribute 201, channels datagrams received from the initiator node 304 to the target node 306 in the switchless network Cloud Computing Environment Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
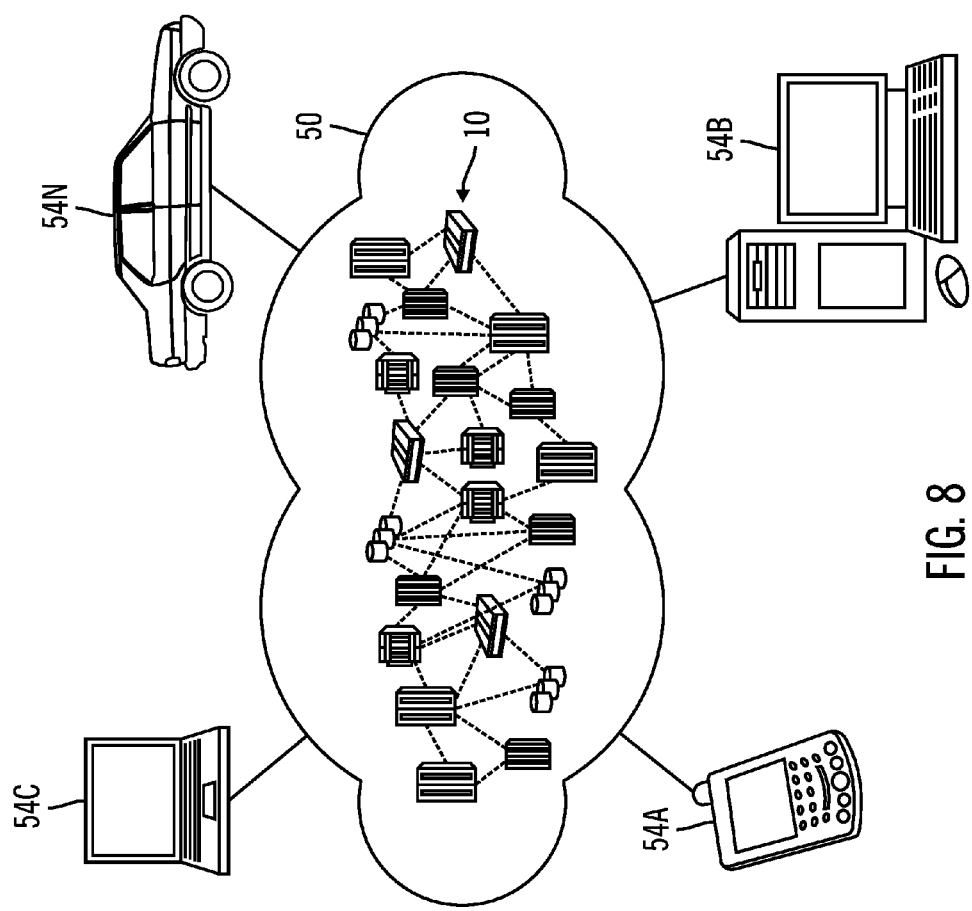
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
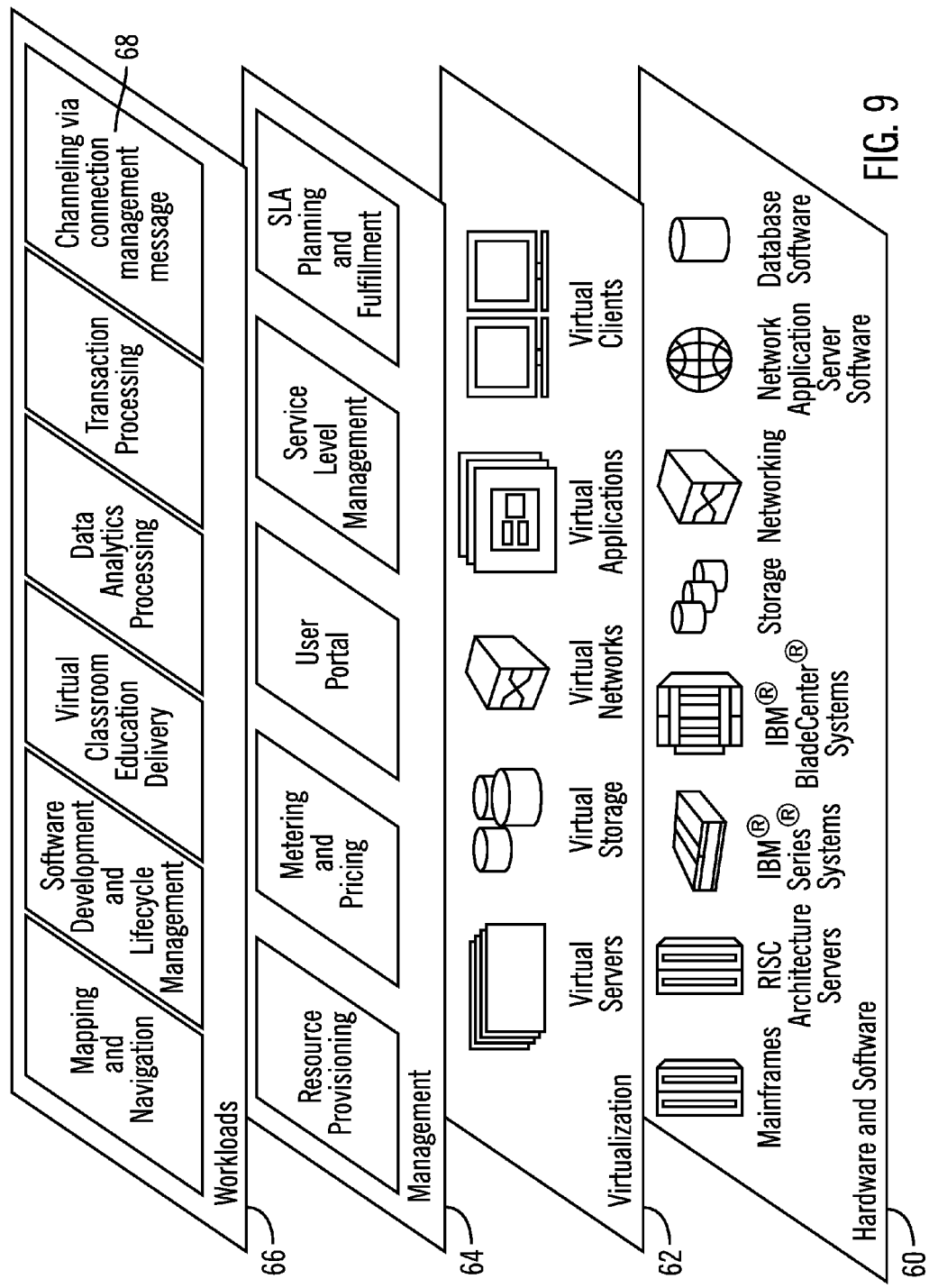
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing;

transaction processing; and the channeling via connection management message 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
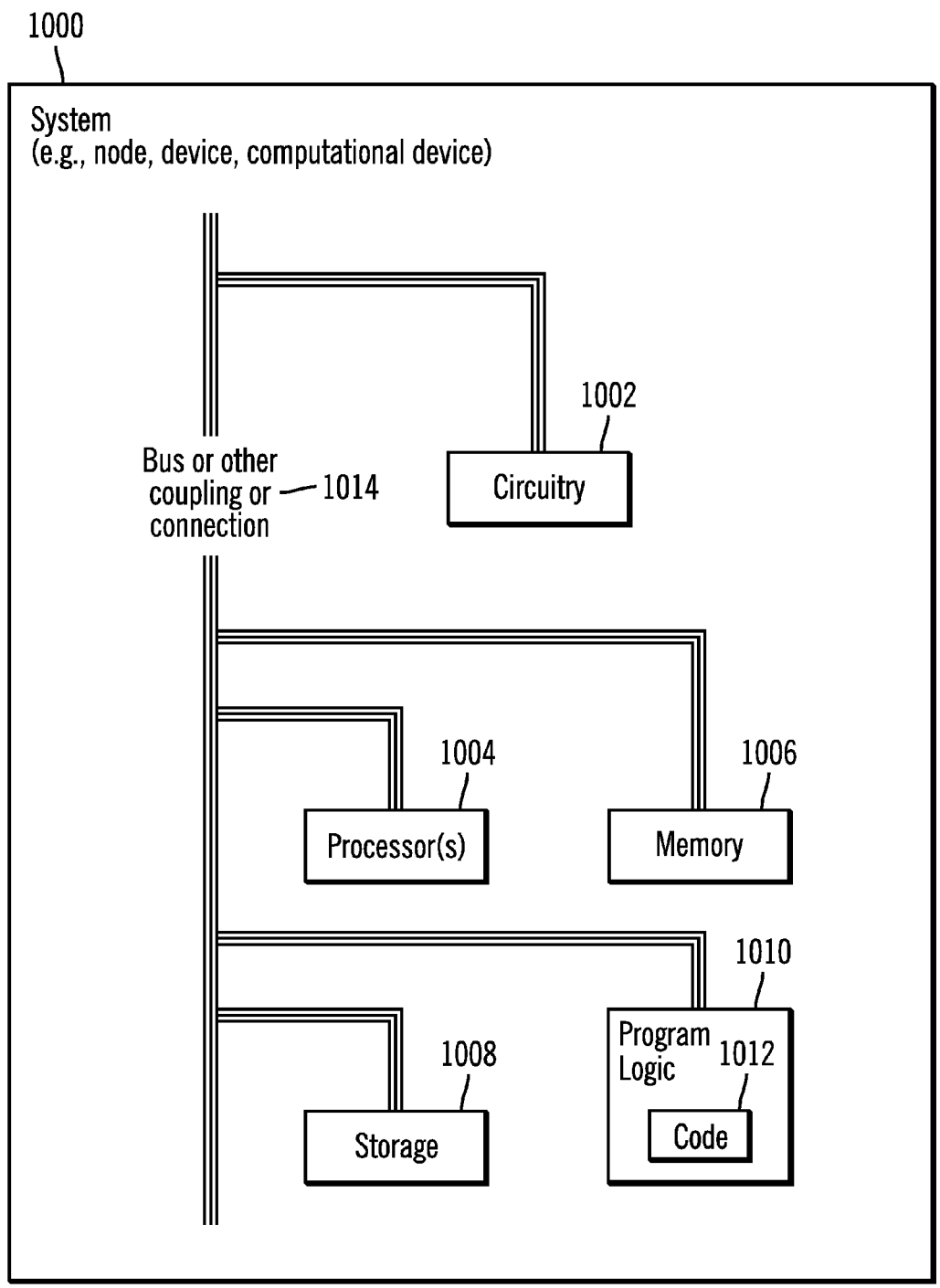
FIG. 10 illustrates a block diagram of a computational system that shows certain elements that may be included in one or more nodes, as described in FIGS. 1-9, in accordance with certain embodiments.

FIG. 10 illustrates a block diagram that shows certain elements that may be included in the nodes 102, 104, 106, 108 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving a connection management message that uses a proxy attribute, wherein the connection management message includes information on a first proxy queue pair and a second proxy queue pair, wherein the first proxy queue pair provides communication between a proxy node and an initiator node in a switchless network, and wherein the second proxy queue pair provides communication between the proxy node and a target node in the switchless network; and
channeling, via the connection management message that uses the proxy attribute, datagrams received from the initiator node to the target node in the switchless network.

2. The method of claim 1, wherein host channel adapters of the initiator node, the proxy node, and the target node do not have routing capabilities for routing datagrams.

3. The method of claim 1, wherein the connection management message comprises a special management datagram (MAD) class in an InfiniBand standard, and the proxy attribute comprises a ProxyMADcommand in the InfiniBand standard.

4. The method of claim 1, the method further comprising:
generating the first proxy queue pair and the second proxy queue pair, in response to determining that a hop count for a received datagram does not equal a hop length for the datagram.

5. The method of claim 1, the method further comprising:
generating a normal queue pair in response to determining that a hop count for a received datagram equals a hop length for the datagram.

6. The method of claim 5, wherein Remote Direct memory Access (RDMA) writes are performed by the first and the second proxy queue pairs by determining free reserved addresses from a next proxy node and then performing RDMA writes to the next proxy node.

7. The method of claim 1, wherein the datagrams are associated with connection management in an InfiniBand network.

8. A system comprising a proxy node in a switchless network, the system comprising:
a memory; and
a processor coupled to the memory, wherein the processor performs operations, the operations comprising:
receiving a connection management message that uses a proxy attribute, wherein the connection management message includes information on a first proxy queue pair and a second proxy queue pair, wherein the first proxy queue pair provides communication between the proxy node and an initiator node in the switchless network, and wherein the second proxy queue pair provides communication between the proxy node and a target node in the switchless network; and
channeling, via the connection management message that uses the proxy attribute, datagrams received from the initiator node to the target node in the switchless network.

9. The system of claim 8, wherein host channel adapters of the initiator node, the proxy node, and the target node do not have routing capabilities for routing datagrams.

10. The system of claim 8, wherein the connection management message comprises a special management datagram (MAD) class in an InfiniBand standard, and the proxy attribute comprises a ProxyMADcommand in the InfiniBand standard.

11. The system of claim 8, the operations further comprising:
generating the first proxy queue pair and the second proxy queue pair, in response to determining that a hop count for a received datagram does not equal a hop length for the datagram.

12. The system of claim 8, the operations further comprising:
generating a normal queue pair in response to determining that a hop count for a received datagram equals a hop length for the datagram.

13. The system of claim 12, wherein Remote Direct memory Access (RDMA) writes are performed by the first and the second proxy queue pairs by determining free reserved addresses from a next proxy node and then performing RDMA writes to the next proxy node.

14. The system of claim 8, wherein the datagrams are associated with connection management in an InfiniBand network.

15. A computer program product, the computer program product comprising a computer readable storage medium having computer readable program code embodied therewith, the computer readable program code configured to perform operations, the operations comprising:
receiving a connection management message that uses a proxy attribute, wherein the connection management message includes information on a first proxy queue pair and a second proxy queue pair, wherein the first proxy queue pair provides communication between a proxy node and an initiator node in a switchless network, and wherein the second proxy queue pair provides communication between the proxy node and a target node in the switchless network; and
channeling, via the connection management message that uses the proxy attribute, datagrams received from the initiator node to the target node in the switchless network.

16. The computer program product of claim 15, wherein host channel adapters of the initiator node, the proxy node, and the target node do not have routing capabilities for routing datagrams.

17. The computer program product of claim 15, wherein the connection management message comprises a special management datagram (MAD) class in an InfiniBand standard, and the proxy attribute comprises a ProxyMADcommand in the InfiniBand standard.

18. The computer program product of claim 15, the operations further comprising:
generating the first proxy queue pair and the second proxy queue pair, in response to determining that a hop count for a received datagram does not equal a hop length for the datagram.

19. The computer program product of claim 15, the operations further comprising:
generating a normal queue pair in response to determining that a hop count for a received datagram equals a hop length for the datagram.

20. The computer program product of claim 19, wherein Remote Direct memory Access (RDMA) writes are performed by the first and the second proxy queue pairs by determining free reserved addresses from a next proxy node and then performing RDMA writes to the next proxy node.

* * * * *